March 28, 1961     J. W. PICKRELL     2,976,647
AGRICULTURAL SPRAYING

Filed April 7, 1958     2 Sheets-Sheet 1

INVENTOR.
JOHN W. PICKRELL
BY John D. Myers
ATTORNEY.

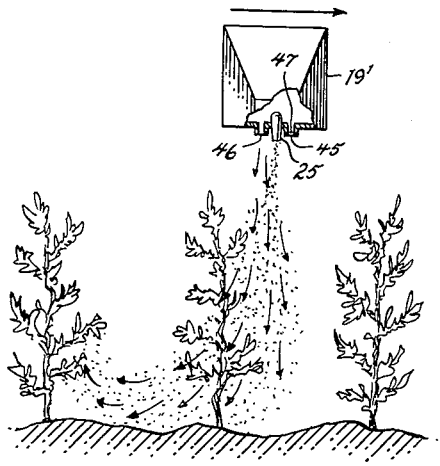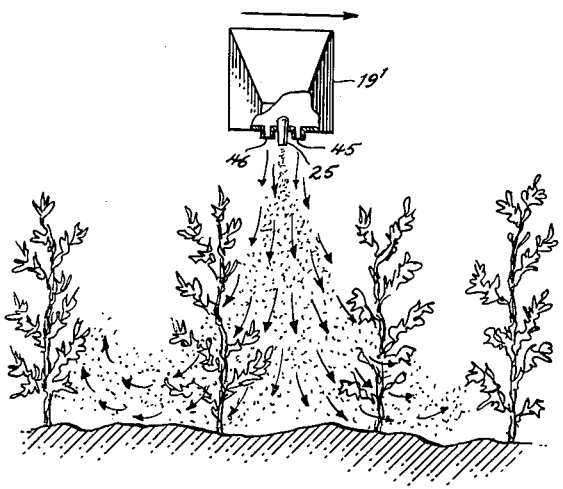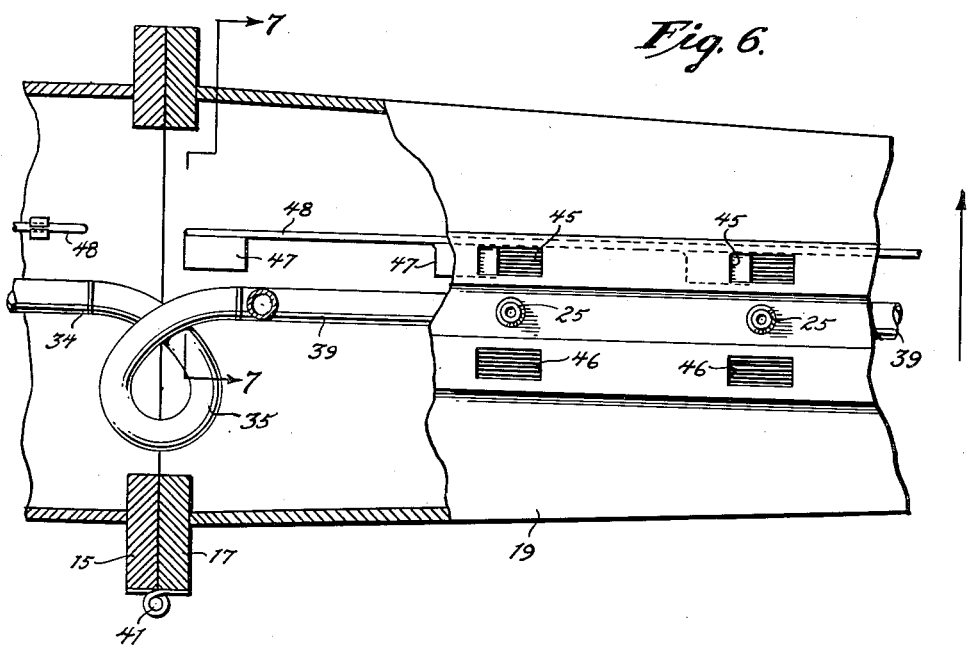

2,976,647
AGRICULTURAL SPRAYING

John W. Pickrell, 829 W. Hollyhock, Scottsdale, Ariz.

Filed Apr. 7, 1958, Ser. No. 726,918

11 Claims. (Cl. 47—58)

This invention relates to the spraying of agricultural chemicals and the like, concerning especially improvement in the discharge and distribution of such liquid in the field.

This application is a continuation-in-part of the application Serial No. 666,001 filed June 17, 1957, now abandoned.

In the interest of convenience and economy in the application of fungicides, insecticides, regulators of plant growth, and other agricultural chemicals to plants, the discharge location for the applied material usually is at plant level, most often in the vicinity of the tops of the plants being treated. Even where the plants are not very tall, it has proved quite difficult to treat them evenly throughout, especially on the underside of foliage, as is often so important.

A primary object of the present invention is improved application of agricultural chemicals to plants, including especially the underside of the leaves thereof, and an object is provision of a novel discharge arrangement for use in plant spraying. A further object is construction of a traveling sprayer effective to accomplish the above objects. Other objects of this invention, together with means and methods for attaining the various objects, will be apparent from the following description and the accompanying diagrams.

Figure 1:
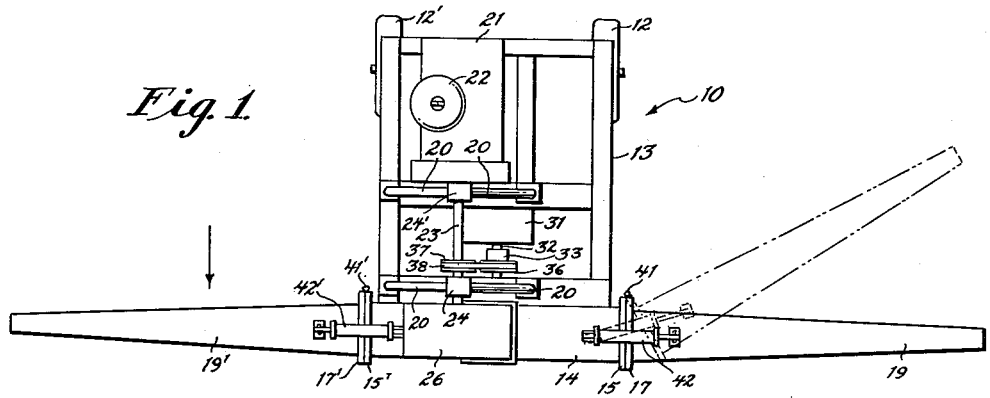
Figure 2:
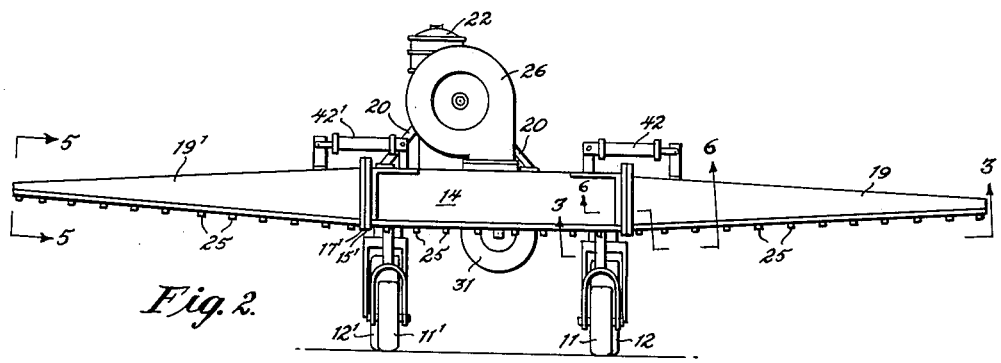
Figure 3:
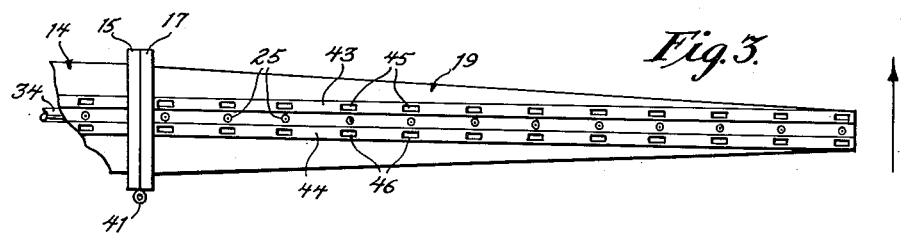

Fig. 1 is a plan of apparatus useful according to the present invention; Fig. 2 is a front elevation of the apparatus of Fig. 1; and Fig. 3 is a bottom view of a portion of the apparatus of the preceding views taken at 3—3 of Fig. 2. Fig. 4 is a side elevation illustrating the treatment of plants by means of the apparatus previously shown; Fig. 5 is a view taken at 5—5 of Fig. 2 and similar to Fig. 4 but illustrating a modification in the pattern of treatment; Fig. 6 is a fragmentary view, partly in section of the bottom of a portion of the same apparatus, taken at 6—6 of Fig. 2; and Fig. 7 is a sectional side elevation of a portion of the apparatus taken at 7—7 of Fig. 6.

In general, the objects of the present invention are accomplished, in the application of agricultural chemicals or the like in liquid form to plants, by discharging the liquid as droplets downward toward the ground from plant level from a plurality of aligned liquid discharge locations and blowing air downward from air locations immediately adjacent and parallel to the line of liquid discharge locations while moving the liquid discharge locations unidirectionally over the ground. The invention contemplates performance of this by means comprising a plurality of uniformly downwardly directed outlets for liquid aligned with one another transversely to the line of travel, a separate but adjacent plurality of uniformly downwardly directed outlets for air aligned with the line of liquid outlets, means for squirting liquid through the liquid outlets, and means for blowing air simultaneously through the air outlets.

Figs. 1 and 2 show from above and from the front, respectively, a travelling sprayer comprising mobile tractor 10 having front ground wheels 11, 11' (visible only in Fig. 2) and rear ground wheels 12, 12' supporting frame 13. Carried by the front portion of the frame is a boom having a central duct 14, which communicates at opposite ends with pair of outrigger ducts or booms 19, 19' at the right and left sides of the drawing (i.e., the left and right sides, respectively, of the sprayer considered from the direction of travel—indicated by arrow). The central duct terminates at its opposite ends in flanges 15, 15' met by respective flanges 17, 17' on booms 19 and 19'. Engine 21, with air cleaner 22 visible above it, is carried by the frame at the rear. The respective booms are hinged at their trailing edges on pins 41, 41' and have fluid-pressure cylinders 42, 42' connecting the booms to the central duct to control retraction of the booms rearwardly in a horizontal plane about the hinge pins (the actuating mechanism for these cylinders being conventional in design and having been omitted from the drawings in the interest of clarity). The partially retracted position of boom 19 appears in phantom in Fig. 1.

Drive shaft 23 supported in front and rear journals 24, 24' mounted in struts 20 extending upward from the frame runs from the front of the engine to blower 26 carried on central duct 14 with the blower outlet in communication with the interior of the duct. Carried at a lower level by the frame is spray tank 31 for the liquid to be sprayed. Tube 32 leads from the tank to central pipe line 34 (visible in Fig. 3) within the central duct and is interrupted by pump 33. The pump is driven by pulley 36 connected to pulley 37 on the drive shaft by belt 38. The central pipe line connects to outrigger lines 39 located within the boom (see Fig. 6). Downwardly directed nozzles 25 on the central and outrigger pipe lines are visible below the bottom edge of the central duct and the bottom edges of the booms.

Fig. 3 shows, from below, boom 19 and an adjacent portion of the central duct. Part of central pipe line 34 is exposed in this view. Visible flanking the row of nozzles 25 are front and rear depending channels 43 and 44 running longitudinally of the boom and duct, each channel being provided with a row of apertures as air outlets, apertures 45 being present in the front channel and apertures 46 at the rear. Details of these apertures and of the intervening nozzles, as well as the pipe lines, appear in Figs. 6 and 7, which also show shutters 47 on rod 48 (discontinuous at the flanges) partially overlying front apertures 45. Flexible hose 35 connecting central pipe line 34 with pipe line 39 of boom 19 also appears in Fig. 6; a similar hose (not shown) connects the central pipe line with the similar pipe line of the opposite boom.

Figs. 4 and 5 show spray patterns obtainable with the illustrated and described apparatus of this invention, being more or less characteristic of two extreme ratios of the air flow (indicated by arrows) from the apertures in front and in back of the spray nozzles. In both instances the liquid is pumped from the supply tank through the pipe lines and out the nozzles, which are dimensioned, as will be apparent to one skilled in the art, to discharge the liquid in the form of droplets (indicated by dots). Simultaneously, air is supplied by the blower (suitably of conventional centrifugal design) from the atmosphere into the central duct and thence to the communicating outrigger booms 19, 19' to discharge through the uncovered apertures. During the spraying operation the apparatus is drawn (or self-propelled) over the ground (or corresponding medium) in which the plants to be treated are located.

When the discharge of air ahead of the nozzles is absent or slight and the discharge from the rear nozzles is not overly strong, the resulting pattern (Fig. 4) is characterized by a flow of air therefrom downward and predominantly to the rear of vertical because of the forward movement of the sprayer and the resistance of the surrounding air. The liquid particles follow a similar path for like reasons, and many (perhaps most) of them striking the surfaces of the plants do so from above. However, the flow of air charged with liquid particles soon curves upward (to the rear) because of the proximity of the ground whereupon many of the liquid particles strike the plant surfaces from below and remain there. Of course, the treating liquid may include surface-tension depressants, as is well known in the art, to aid the capture of the liquid by the plants.

When the discharge of air ahead of the nozzles is comparable to that following the nozzles, a more symmetrical treating pattern is obtained (Fig. 5), so long as the rate of travel of the sprayer is not immoderately great. Some of the air charged with the liquid particles flows downward and to the rear as before, while some of it flows in similar manner downward and to the front, thus providing more positive treatment of the portions of the plant oriented toward the approaching sprayer. This symmetrical flow pattern may not be obtained at such low total flow rates that the same flow could occur without difficulty from one set of apertures alone (and, relatively, at high flow rates a single set of apertures may tend to give a more or less symmetrical pattern). However, another important benefit attends air flow from a location immediately adjacent and ahead of the nozzles for the liquid, the leading air flow tending to orient the flat expanses of foliage end-on so as to reduce the difficulty of penetration of liquid droplets to the lower levels, which is a real difficulty with wide leaves or at high foliage densities, such as characterized in the castor bean plant, for example. A little observation and experience on the part of the spray operator will permit ready adjustment of the total air flow and the ratio of front-to-rear air flows to obtain maximum desired coverage.

Frequent shutter adjustment usually is not necessary, and the positions of the shutters can be set from time to time with the booms temporarily in the restricted position; however, where more frequent adjustment is desirable a simple disconnecting linkage of plug-and-jack or similar type can be employed, as will be apparent, to bridge the discontinuity of the shutter rods in the vicinity of the flanges. Of course, other changes can be made in the structure of this apparatus without involving a departure from the invention as claimed.

The claimed invention:

1. Method of applying agricultural chemicals and the like in liquid form to plants, comprising discharging the liquid as droplets downward toward the ground from plant level from a plurality of aligned liquid discharge locations and blowing air downward from air locations immediately adjacent and parallel to the line of liquid discharge locations while moving the liquid discharge locations unidirectionally over the ground.

2. In traveling spraying of plants with agricultural chemicals and the like in liquid form, the improvement comprising discharging the liquid downward as droplets from a plurality of mutually parallel outlet locations aligned perpendicularly to the direction of travel on a level approximating that of the tops of the plants and simultaneously blowing air downward from closely adjacent the aligned liquid outlet locations.

3. The process of claim 2 in which air is blown downward adjacent the aligned liquid outlet locations from both leading and trailing locations with respect thereto referred to the direction of travel.

4. The process of claim 3 in which the air flow from the respective leading and trailing locations is controllable independently of the liquid discharge, and the air flow from the leading location is held at a given ratio with respect to the air flow from the trailing location.

5. In a sprayer for agricultural chemicals and the like in liquid form, the improvement comprising a boom extending transversely to the direction of travel of the sprayer, a plurality of uniformly downwardly directed outlets for liquid aligned with one another on said boom, a separate but adjacent plurality of uniformly downwardly directed outlets for air aligned with the line of liquid outlets, means operatively connected to the liquid outlets and adapted to squirt liquid through the outlets, and means operatively connected to the air outlets and adapted to blow air simultaneously through the air outlets.

6. In a sprayer for agricultural chemicals and the like in liquid form, the improvement comprising a boom adapted to conduct air therethrough, a row of uniformly downwardly directed outlets for liquid aligned with one another and a pair of rows of similarly directed outlets for air closely flanking the row of liquid outlets.

7. The apparatus of claim 6, plus means operatively connected to the liquid outlets and adapted to squirt liquid through the liquid outlets, means operatively connected to the air outlets and adapted to blow air simultaneously through the air outlets, and means operatively connected to the air-blowing means and adapted to vary the air flow through the air outlets in one row with respect to that through the air outlets in the other row.

8. In a traveling sprayer, a boom extending transversely to the direction of travel and adapted to conduct air therethrough, a reservoir of liquid to be sprayed, a pipe line leading from the liquid reservoir along the boom and having downwardly directed nozzles connected thereto and exposed below the bottom of the boom, means operatively connected to the pipe line and adapted to force liquid from the reservoir through the pipe line and out the nozzles, air outlets in the bottom of the boom paralleling the nozzles, and means communicating with the interior of the boom and adapted to force air into and through the boom and out the air outlets.

9. In application of agricultural chemicals and the like in liquid form to plants, the improvement comprising directing a spray of droplets thereof downward substantially vertically from a plurality of aligned discharge locations in the vicinity of the plants to be treated therewith and effecting substantially horizontal travel of the liquid discharge locations, also directing a blast of air downward substantially vertically from a separate discharge location closely trailing each liquid discharge location and fixed with respect thereto, and thereby enveloping the droplets in air flow directed toward the ground and then in a predominantly rearward direction with respect to the travel of the discharge locations.

10. The process of claim 9, plus the step of also directing a blast of air downward substantially vertically from a separate discharge location closely leading each liquid discharge location and fixed with respect thereto, and thereby enveloping the droplets in air flow directed downward toward the ground and then in both forward and rearward directions with respect to the travel of the discharge locactions.

11. Process for treating plants with agricultural chemicals and the like in liquid form, comprising discharging the treating liquid downward in the form of droplets from a multiplicity of aligned locations traveling at substantially uniform height, the aligned liquid discharge locations all traveling over the ground at the same speed in a direction substantially perpendicular to both the direction of alignment and the downward direction of discharge, discharging air downward from a multiplicity of locations aligned parallel to and traveling with the liquid discharge locations but separate therefrom, at least one air discharge location being located immediately ahead and at least one air discharge location being located immediately behind each of the liquid discharge locations.

References Cited in the file of this patent

UNITED STATES PATENTS

| | | |
|---|---|---|
| 296,488 | Van Gaasbeek | Apr. 8, 1884 |
| 827,174 | Patterson | July 31, 1906 |
| 2,301,213 | Kang | Nov. 10, 1942 |
| 2,311,782 | Segars | Feb. 23, 1943 |
| 2,400,702 | Messinger et al. | May 21, 1946 |
| 2,784,521 | Britten et al. | Mar. 12, 1957 |

FOREIGN PATENTS

| | | |
|---|---|---|
| 150,367 | Australia | Mar. 3, 1953 |
| 988,165 | France | Apr. 25, 1951 |